Figure 1:
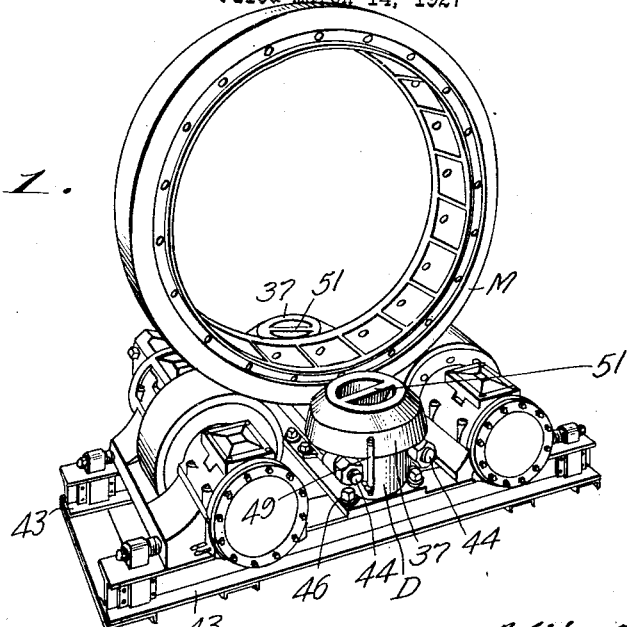

April 17, 1928.

R. BERNHARD

THRUST ROLLER 1,666,436

Filed March 14, 1927

Inventor
RICHARD BERNHARD,
By Spear, Middleton, Donaldson, & Hall
Attorneys

Patented Apr. 17, 1928.

1,666,436

UNITED STATES PATENT OFFICE.

RICHARD BERNHARD, OF ALLENTOWN, PENNSYLVANIA, ASSIGNOR TO TRAYLOR ENGINEERING & MANUFACTURING COMPANY, OF ALLENTOWN, PENNSYLVANIA, A CORPORATION OF DELAWARE.

THRUST ROLLER.

Application filed March 14, 1927. Serial No. 175,369.

This invention relates to improvements in roller devices for taking up thrust and more particularly it relates to a thrust roller device to receive the end thrust of a rotary kiln shell or the like.

An object of the invention is to provide a novel form of thrust roller which is of such strength that the rollers will readily hold any kiln shell in proper place on the supports.

Another object of the invention is to provide a thrust roller of simple, rugged, construction which presents a large contact surface to the tire of the rotating kiln while taking the thrust, so that cutting and pitting of the edge of the tire is eliminated.

Additional objects will appear from the following description.

The invention consists in the features, combination and arrangement of parts hereinafter described and particularly pointed out in the claim.

In the drawings:

Figure 1 is a general view of the assembled apparatus showing the thrust rollers mounted on a structural supporting frame, one roll on each side of the tire of the rotary kiln shell, which tire also contacts with and is supported by bearing rollers which are also mounted upon the structural frame. The thrust roller bearings shown in this figure are of slightly different arrangement from that shown in Fig. 2.

Figure 2:
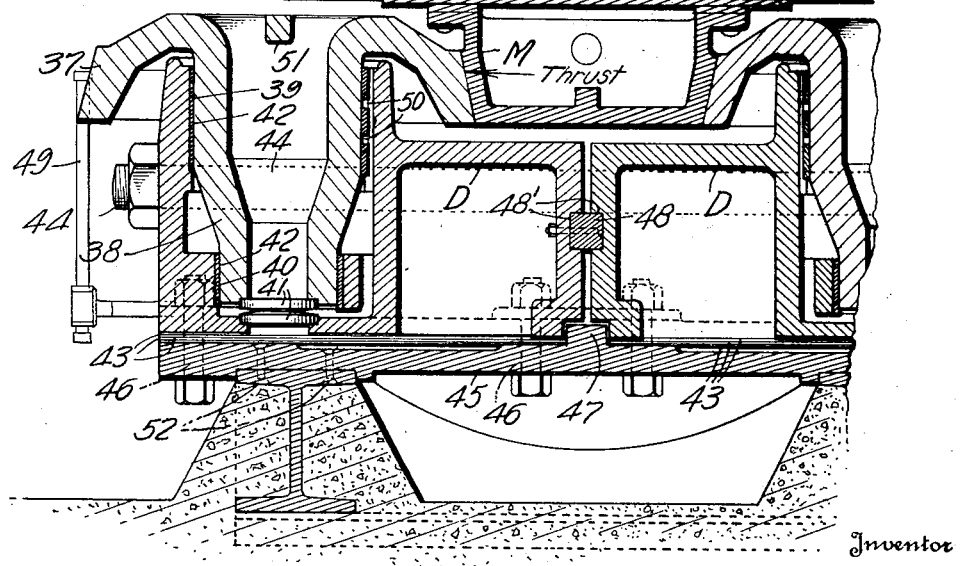

Fig. 2 is a section through one of the thrust rollers and its bearing.

In the use of the larger kilns, say those longer than 250 feet, there is an enormous end thrust because of the great weight of the moving parts of the kiln. The thrust is due to the inclination of the kiln and some misalignment of the carrying rollers. The thrust rollers as made heretofore, were of light construction and in many cases they were torn off because of insufficient strength. The novel construction of the present invention provides for adequate strength to withstand the end thrust of any kiln shell.

Referring to the drawings, D represents a pair of bearing boxes which are tied together by two large rods 44, one on each side of the boxes. The boxes are also bolted down as at 46 to a base plate 45 riveted to the steel supporting frame as at 52. The bearing boxes are prevented from sliding on the frame by the lug 47 cast integral with the base plate. The bearing boxes are prevented from turning, twisting or lifting with respect to each other by the feather 48 inserted in recesses 48ª in the ends of the boxes.

A roller having a conical thrust receiving surface 37 is mounted in each bearing box D. The roller is cast integral with its shaft or shank 38 and the shaft has two bearings. The upper bearing 39 is the larger and is practically directly in line with the thrust. The lower bearing 40 is smaller and steadies the roller in its support. The weight of the roller is carried on steel buttons 41 which are mounted in the bottom of the bearing box. Bronze liners or bushings 42 are provided for the two bearings.

The bearing boxes are adjustable on the frame so that the rollers may be located to suit the position of the tire M of the rotary kiln shell. This adjustment is obtained by the use of shims 43 so that the bearings may be raised or lowered and moved in line with the kiln if necessary.

The conical surface of the roller 37 is formed on an overhanging extension of the shaft 38 and as shown in Fig. 2 engages the corresponding conical surface of the edge of the tire M and the thrust is transmitted through this contact.

Both bearings are entirely submerged in oil. A filling and tell-tale pipe 49 is provided to insure proper amount of oil. Oil channels 50 are provided in the bearing casing to permit the oil to circulate.

A bar 51 is cast across the opening in the top of the roller for lifting purposes.

The contact surface being on the pitch cone of the roller, there is no slipping and a large contact surface is presented on the tire taking the thrust. Formerly cylindrical thrust rollers were used and with cylindrical rollers only a small contact area was obtained and this resulted in cutting and pitting the edge of the tire. The present invention overcomes this difficulty.

I claim:

In a roller bearing device for receiving the end thrust of a rotary kiln, a bearing box open at its top and having upper and lower bearings therein, a roller having a shank portion adapted to be received in said bearing box and provided with upper and lower bearings to engage the corresponding bearings in the bearing box, said roller having an overhanging portion constituting an extension of the shank portion, said overhanging portion having a conical thrust receiving surface adapted to contact with a corresponding surface on the tire of the rotary kiln to receive the thrust, said thrust receiving surface and said upper bearing of the roller being substantially in alignment with each other, and with the line of thrust so that they may both be intersected by a common horizontal plane including the line of thrust, the bearings in said bearing box being adapted to be entirely and continually submerged in oil.

In testimony whereof I affix my signature.

RICHARD BERNHARD.